(Model.)

T. MULVIN.
ROLLER SKATE.

No. 330,041. Patented Nov. 10, 1885.

Witnesses
W. B. Ridge
J. Coleman

Inventor:
Thomas Mulvin

UNITED STATES PATENT OFFICE.

THOMAS MULVIN, OF UNION CITY, PENNSYLVANIA.

ROLLER-SKATE.

SPECIFICATION forming part of Letters Patent No. 330,041, dated November 10, 1885.

Application filed October 23, 1884. Serial No. 146,330. (Model.)

*To all whom it may concern:*

Be it known that I, THOMAS MULVIN, a citizen of the United States, residing at Union City, in the county of Erie and State of Pennsylvania, have invented an Improvement in the Trucks of Roller-Skates, of which the following is a specification.

My invention relates to that class of roller-skates which have rubber interposed between the bearer and saddle in each truck; and the object of the improvement is to not only give a lateral motion of the foot on the truck, but also to give elasticity to the tread and to greatly simplify and cheapen the construction of the truck, also making the skate self-adjusting to the weight of the wearer. I attain these objects by the mechanism illustrated in the accompanying drawings.

Figure 1:
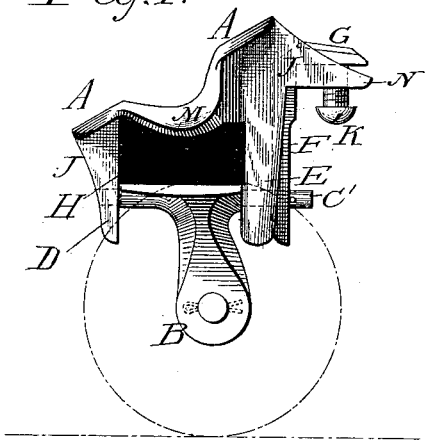
Figure 2:
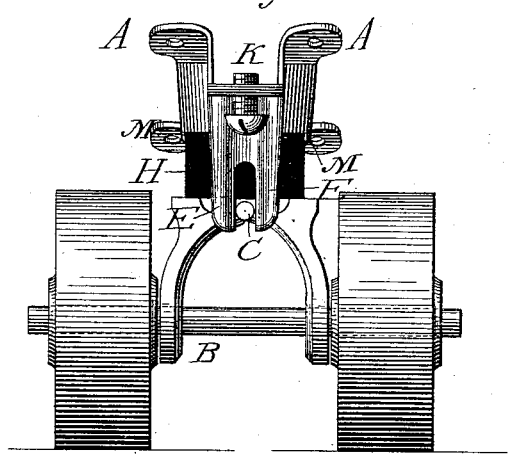
Figure 3:
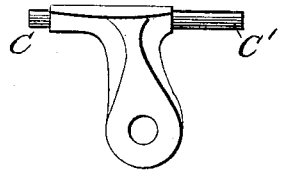
Figure 4:
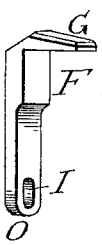

Figure 1 is a side view of truck. Fig. 2 is a rear end view of the saddle and rubber, the rubber-clamp being removed. Fig. 3 is a side view of the bearer. Fig. 4 is a perspective of the adjustable rubber-clamp.

The same letters refer to like parts in all the figures.

I have represented but one truck, as both front and rear are alike.

A A are flanges at the top of the saddle, through which screws pass into the foot-piece of the skate.

B is the axle.

C C' are journals on which the saddle J rocks sidewise.

D is the front flange of the saddle, through which the front end of journal C, Fig. 3, has a bearing.

E E are projections from the saddle downward, allowing the rear journal, C', to play between them.

F is a clamp. The elongated hole I at its lower end passes over and is keyed to journal C', (see Fig. 1,) its lower end, O, having been passed downward through a central hole in the saddle till it reached C', but its upper end, G, is bent at right angles till it comes over the screw K, Fig. 1, as seen by the dotted lines. The screw K is boxed through N and impinges up against G. The rubber H is fitted between the saddle and the bearer, and is held in place by light flanges M M on the under side of the saddle.

Now, when the parts are all in place, the screw K is pressed against G till the top of the rubber is drawn snugly up against the under side of the saddle between the flanges M M, when it is ready for use.

The saddle is free to rock sidewise on the rubber, being held central by journals C C', and yet the wearer has the full benefit of the spring of the rubber block by reason of the slot between parts E E, the rubber thus performing the double duty of giving an elastic side motion to the foot and at the same time giving great elasticity to the tread at both toe and heel.

I am aware that prior to my invention roller-skates have been made to rock sidewise on rubber blocks. I therefore do not claim such combination, broadly; but What I do claim as my invention, and desire to secure by Letters Patent, is—

1. The combination, in a roller-skate, of the clamp F, rubber H, and screw K, substantially as described.

2. The combination of the slotted saddle E E, journals C C', and clamp F, substantially as described, and for the purpose specified.

THOMAS MULVIN.

Witnesses:
   J. E. BEEBE,
   A. S. LEWIS.